Nov. 2, 1965    B. M. STILLWELL    3,215,071
AUTOMATIC WORK HOLDING APPARATUS
Filed May 2, 1963    6 Sheets-Sheet 1

Inventor
BRIAN M. STILLWELL
By [signature]
Attorneys

Nov. 2, 1965   B. M. STILLWELL   3,215,071
AUTOMATIC WORK HOLDING APPARATUS
Filed May 2, 1963   6 Sheets-Sheet 3

Fig. 4.

Inventor
BRIAN M. STILLWELL
By *Imrie & Smiley*
Attorneys

Nov. 2, 1965 B. M. STILLWELL 3,215,071
AUTOMATIC WORK HOLDING APPARATUS
Filed May 2, 1963 6 Sheets-Sheet 4

Fig.5.

Inventor
BRIAN M. STILLWELL
By *Smiley & Smiley*
Attorneys

Nov. 2, 1965    B. M. STILLWELL    3,215,071

AUTOMATIC WORK HOLDING APPARATUS

Filed May 2, 1963    6 Sheets-Sheet 5

Inventor
BRIAN M. STILLWELL
By *Emirick Smiley*
Attorneys

Nov. 2, 1965  B. M. STILLWELL  3,215,071
AUTOMATIC WORK HOLDING APPARATUS
Filed May 2, 1963  6 Sheets-Sheet 6

Fig. 9.

Inventor
BRIAN M. STILLWELL
By *Imirie & Smiley*
Attorneys

United States Patent Office 3,215,071
Patented Nov. 2, 1965

3,215,071
AUTOMATIC WORK HOLDING APPARATUS
Brian Michael Stillwell, Worton Manor, Bridge Road,
Isleworth, Middlesex, England
Filed May 2, 1963, Ser. No. 277,637
Claims priority, application Great Britain, May 11, 1962,
18,138/62
5 Claims. (Cl. 101—126)

This invention relates to machines where it is necessary or preferred to transfer workpieces especially plate-like workpieces or similar objects from one position, for example a loading position, to an alternative position or positions, and particularly but not exclusively in a printing machine such as a screen printing machine to move workpieces such as sheets or plates into and out of a printing position.

In known screen printing processes a workpiece, such as a paper or metal sheet on which are to be printed several impressions, is placed under the screen of the printing machine and clamped thereon by suitable means; the printing process is effected and the individual impressions are then cut from the workpiece, after its removal from the machine, either by hand or by a suitable cutting tool having the peripheral contour of the impression. This process frequently results in waste of the workpiece material in addition to being slow and uneconomical.

The main object of the present invention is to provide an apparatus which will enable the workpieces such as flat sheets or plates of paper, cardboard, metal or the like to be moved in rapid succession through the working stations.

Another object is to provide an apparatus for printing impressions on such workpieces, used in combination with said apparatus.

According to the present invention, an apparatus for transferring workpieces from a first position to a second position comprises a bed presenting supporting surfaces to the workpieces in the first position, said bed having at least one fixed part and at least one movable part, a number of apertures in the supporting surfaces of the bed parts connected through ducts to a source of reduced pressure, means for closing those apertures not covered by a workpiece disposed on the bed, means for moving the movable bed part between the first and second positions, and control means operable to apply the reduced pressure to the apertures in a predetermined sequence to permit the workpiece to be held in contact with a supporting surface of at least one of the bed parts during movement of the movable bed part.

The movable bed part reciprocates between the two positions or may be arranged in the form of a continuous belt running through the first and second positions.

The term workpiece when used herein includes a section of a continuous belt of material to be printed as well as individual articles.

In an alternative embodiment of the invention, the transfer apparatus comprises an apparatus wherein three equally spaced working positions are provided through which a workpiece is to be moved in successive steps, the fixed bed part being in the central position, and the movable bed part has two spaced supporting surfaces mounted in aligned relationship on a carriage movable with respect to the fixed bed part, the distance between said surfaces being equal to the distance between two consecutive working positions whereby a workpiece supported in the initial or central position can be transferred by the moving bed part to the central or final position respectively.

The aperture closing means employed in the transfer apparatus comprises plugs disposed in recesses in the bed parts communicating with the apertures and a source of low pressure, the recesses having seats on which plug seating surfaces are engaged and held when the reduced pressure is applied.

Thus by means of the invention the moving bed part of the apparatus has orifices or apertures or holes through it or part way through it from which air is sucked so that when such orifices, apertures or holes are covered on the exposed surfaces by the workpieces, such workpieces are held in position. The moving part can then transfer the workpieces to another selected position, when vacuum employed on the moving part is released and vacuum applied at the selected stationary position. By this invention provision is made for securing sheets of differing shapes and dimensions at the stationary position.

In a preferred construction the aperture closing plugs are each in the form of a ball inserted into each of the recesses not covered by a workpiece placed on the bed parts and engaging with suitably shaped seats in the recesses, thereby effectively sealing the apertures. The balls are inserted into and removed from the recesses by any suitable means such as for example a magnet.

The method employed in forming the apertures required in the apparatus of the invention is to drill a series of holes through the surface to which the sheets are required to be secured. These holes are then counterbored to receive a ball of steel or other material or a plug or other device which acts as a sealing member against the counterbored face. The holes referred to are channelled to the source of vacuum and those holes which are not covered by the sheet can be sealed off by means of the balls or plugs referred to. A convenient method is to use steel balls as plugs which can be removed by magnets. It will be seen that holes in the supporting surfaces of fixed or moving members of the apparatus may be left open or sealed off as required and that sheets of varying sizes and shapes may be held by vacuum, those holes or orifices not covered by the sheets being sealed off by the plugs or balls.

The movable bed part of the transfer apparatus is preferably mounted on a carriage which is mounted on guides and is operatively connected to the moving part of a fluid operated actuating device, the latter being preferably in the form of a piston and cylinder although any suitable operating means are used such as cam operated levers.

The reduced pressure or vacuum is preferably provided by a vacuum device of conventional construction forming no part of this invention and is operated by the control means in timed relation to the means for moving the movable bed part.

Another object of this invention is to provide with the employment of a transfer apparatus of the invention, a screen printing machine whereby the aforesaid disadvantages of the known machines of this kind are minimised so that a high speed accurate printing of pre-shaped workpieces can be achieved.

According to a further aspect of this invention, a screen printing machine comprises a frame, a screen printing apparatus mounted in said frame, a transfer apparatus of this invention having its fixed bed part disposed beneath the screen of the printing apparatus, and a power operated device operable to move the inking device of the printing apparatus with respect to the screen, the transfer apparatus control means being operatively connected to the power operated device to actuate the inking device in timed relation to the movement of the moving bed part.

In a preferred embodiment of screen printing machine the inking device comprises a flexible blade mounted in a holder pivoted to a member movable in the frame of the printing aparatus, means being provided for reciprocating the blade over the screen and to pivot the holder whereby the blade is moved across the screen out of contact therewith and is then drawn across the screen in pressure contact therewith.

The frame of the screen printing apparatus is preferably pivotally mounted in the machine frame above the screen whereby the inking device is moved to permit ready access to the screen.

In order that the invention may be more clearly understood, some embodiments in accordance therewith will now be described by way of example with reference to the accompanying drawings, in which.

In the drawings the same references have been used to designate the same or similar parts.

Figure 1:
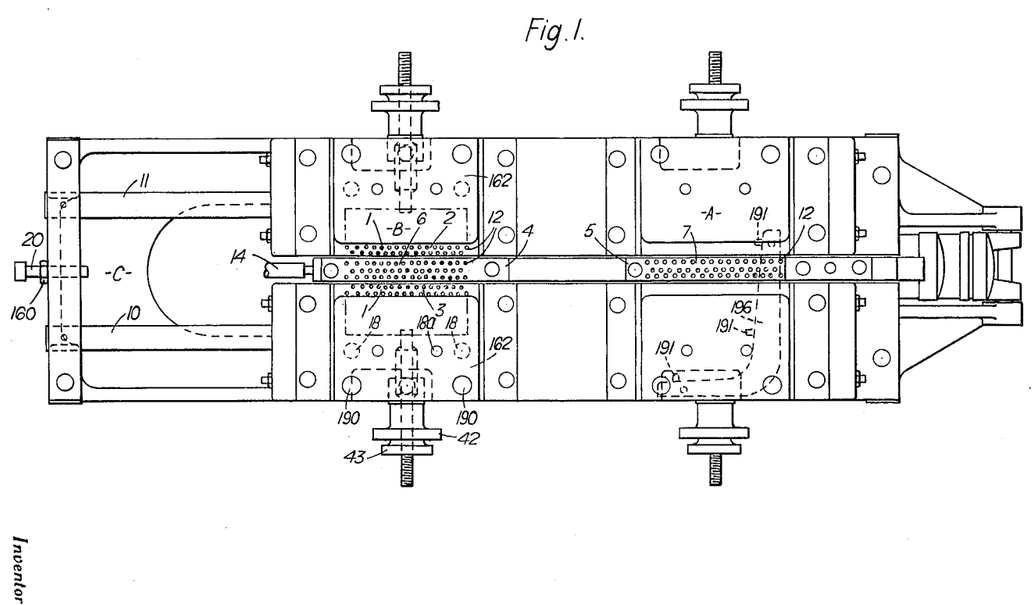
FIGURE 1 is a plan view of a transfer apparatus as applied to a screen printing apparatus.
Figure 2:
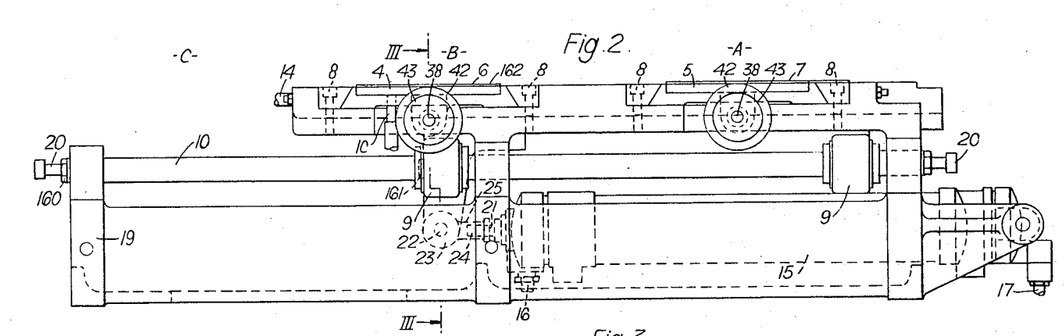
FIGURE 2 is a side elevation of the transfer apparatus shown in FIGURE 1.
Figure 3:
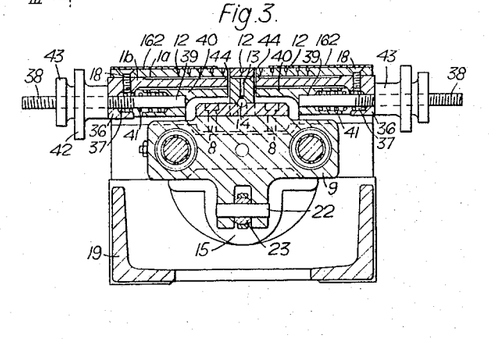
FIGURE 3 is a section along the line III—III of FIGURE 2 looking in the direction of the arrows.

Referring to FIGURES 1 to 3, the transfer apparatus has three equally spaced working positions A, B and C, i.e., loading, working, e.g., printing and delivery positions respectively, through which a workpiece (not shown) is to be moved in successive steps, fixed bed parts 1 having work suporting surfaces 2 and 3 being in the centre position B; movable bed parts 4 and 5, having work supporting surfaces 6 and 7 are mounted and secured by means of bolts 8 in aligned relationship on a carriage 9 movable on guides shown as runners 10 and 11 with respect to the working surfaces of the fixed bed parts. A number of apertures 12 are provided in the work supporting surfaces of the fixed and movable bed parts and those in the moving bed parts are connected by ducts 13 to a main duct 14 connected through a flexible pipe 26 (FIG. 4) to a conventional source of vacuum (not shown since it forms no part of this invention). The fixed bed part apertures are connected through cavities 1a in the base portion 1b of each fixed bed part to a pipe 1c which leads to the source of suction. Means in the form of a cylinder 15 is provided for moving the movable bed part, the cylinder having fluid pressure supply connections 16 and 17. The means for controlling the application of the vacuum to the apertures in the work supporting surfaces of the bed parts is shown at D in FIGURES 4 and 5.

As will be seen from FIGURES 1 to 3, the fixed bed parts 1 are disposed in the central position B and secured by bolts 18 with their supporting surfaces 2, 3 spaced apart by an amount substantially equal to the width of the movable bed parts 4, 5 which move between the said fixed bed parts 1. The supporting surfaces 6, 7 of the movable bed parts are disposed at the same level as those of the fixed bed part so that when one of the movable bed parts is in the central position B, its surface forms, with those of the fixed bed parts, a flush working surface for supporting the workpieces during the printing operation. The distance between the movable bed parts 4 and 5 is substantially equal to the distance between the working positions A, B and C so that as one of the movable bed parts transfers a workpiece from the loading position A to the printing position B, the other movable bed part transfers a previously printed workpiece from the printing position B to the delivery position C.

Figure 4:
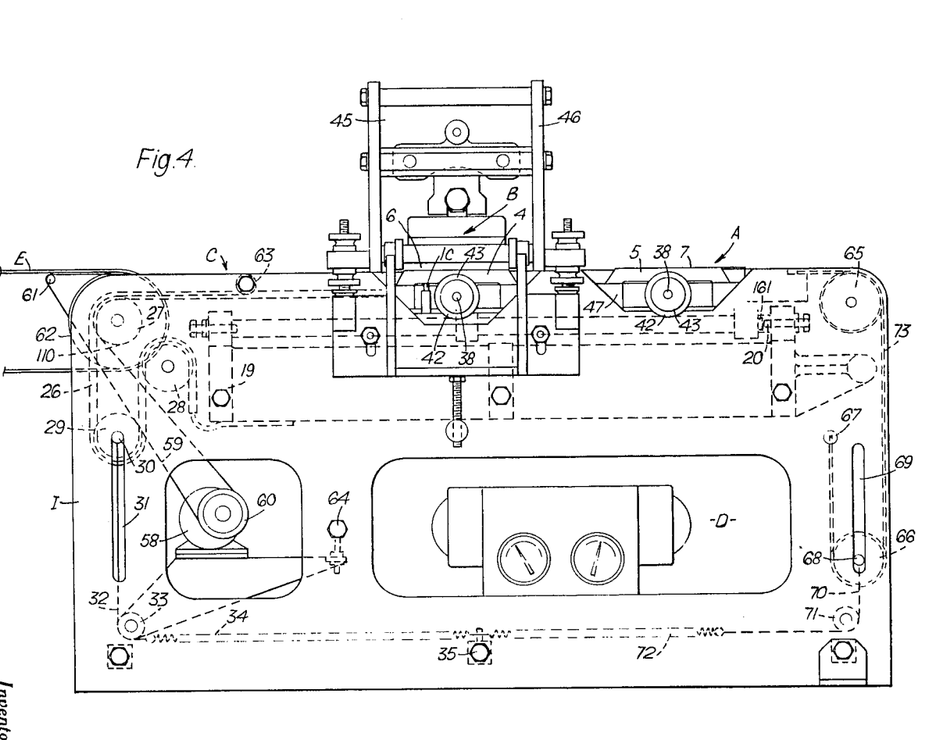
FIGURE 4 is a side elevation of a screen printing machine incorporating the transfer apparatus shown in FIGURES 1 to 3.

The guides or runners 10 and 11 carrying the carriage 9 extend between the two extreme positions A and C and are rigidly mounted in a subframe 19. Adjustable stops 20 against which a hardened insert 161 in each end of the carriage 9 abuts are provided so that the amount of travel of the movable bed parts can be accurately adjusted. The stops 20 have locknuts 160. Shock absorbing means (not shown) are provided in the cylinder 15 to prevent excessive shock when the carriage meets either of the stops 20; or the fluid in the cylinder 15 is used to act as a buffer when the inserts 161 engage the stops 20. There is provided to the left of the position C in FIG. 4 a conveyor or like device E to facilitate unloading and rapid delivery of workpieces from the movable bed part in that position during operation of the transfer apparatus. The device E is shown in FIG. 4 as a conveyor belt of heat resistant material such as asbestos, passing round a tumbler roller F of conventional construction, and in a machine where the workpieces require drying or firing for example the belt E may pass through a drying oven using infra-red heat for example. The piston rod 21 of the cylinder 15 is connected to the carriage 9 by means of a gudgeon pin 22 working in a self aligning bearing 23 in a coupling 25. The end 24 of the piston rod has a thread engaging in a female thread in the coupling 25 to enable the length of the piston rod to be accurately adjusted.

Figure 5:
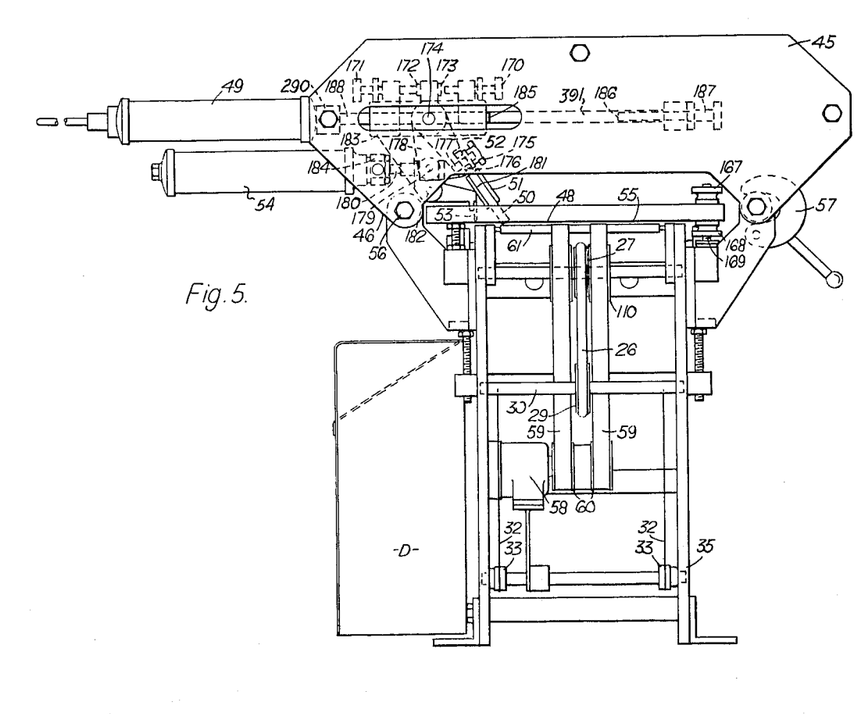
FIGURE 5 is an end view of the machine looking from the right in FIGURE 4.

As seen more clearly in FIGURES 4 and 5, the suction is applied to the movable bed part ducts 13 through a flexible tube 26 connected at one end to the pipe 14 and at its other end to a connector of the vacuum apparatus. This tube 26 is of a length to accommodate the full movement of the moving bed parts and to avoid the slack of the tube being entangled in running parts of the machine, it is passed over pulleys 27, 28 and 29, or similar devices such as rollers, one 29 of which has an axle 30 extending through vertical slots 31 in the machine frame to ride up and down therein to take up the slack of the tube 26; the axle 30 is connected through a flexible member shown as a wire 32 passing over a roller 33 to a tension spring 34, the other end of which is anchored on the machine frame I.

As seen more clearly in FIGURE 3, the fixed bed parts 1 are provided with cover plates 162 secured by the bolts 18 to its surfaces 2 and 3. The cover plates 162 have substantially the same thickness as the workpiece to be printed and are secured on the fixed bed parts in spaced relationship, the spacing corresponding substantially to the width of the workpiece, and the plates are aligned to allow the workpiece to move on the moving bed part without interruption therebetween. The workpiece, and the cover plates form a flush printing surface and when a rigid workpiece is to be printed the plates act as guides for the material as it moves through the printing position.

Magnets 18a are set into and flush with the supporting surfaces of the fixed bed parts near their outer edges to hold workpieces of magnetic materials firmly thereon during the printing operation. Means are also provided for accurately locating the fixed bed parts 1 in the subframe 19 of the transfer apparatus: each fixed bed part 1 has a depending lug 36 with a bore 37 through which passes a threaded rod 38, the inner end of which engages in a threaded bore 39 in a fixed part 40 of the subframe 19. A coil compression spring 41 surrounds the rod 38 and is compressed between the fixed subframe part 40 and the lug 36 thereby urging the lug and its bed part away from the movable bed parts 4 and 5. An adjusting nut 42 is screwed onto the rod 38 and is provided with a locknut 43. Thus, by loosening both the nuts 42 and their locknuts 43, the bed parts 1 can be moved by appropriate screwing of the nuts 42 along the respective rods 38 until the edges 44 of the bed parts 1 are correctly disposed with respect to the moving bed parts 4 and 5, when the locknuts 43 are screwed up to the nuts 42 to lock them. One or the other or both of the bed parts 1 can be adjusted in this manner at any one time.

If desired, on completely removing the nuts 42 and locknuts 43, the bed parts 1 can be removed from the frame of the transfer apparatus to facilitate interchanging bed parts having different sizes and spacings of apertures 12 in their surfaces and having different sizes of cover plates previously bolted onto these surfaces to fit different sizes of workpieces. The machine frame has dowels 190 for locating the fixed bed parts therein and the frame and dowels assembly may be duplicated in a jig to enable frames for subsequent use to be set up away from the machine.

Figure 6:
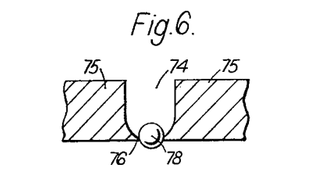
FIGURE 6 shows in section one of the apertures of the bed parts with its aperture closing means.
Figure 7:
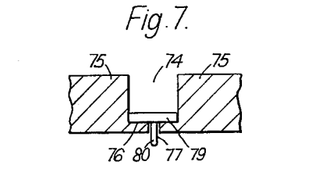
FIGURE 7 is a view similar to that of FIGURE 6 showing another embodiment of the aperture closing means.
Figure 8:
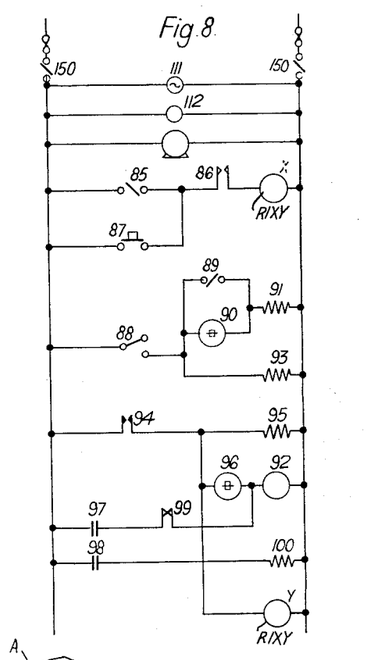
FIGURE 8 is a line diagram of the electrical circuit of a preferred control circuit.

FIGS. 6 and 7 show two preferred embodiments of the aperture closing means in place in apertures in the bed parts. A recess 74 is formed in the supporting surface 75 of one of the bed parts, the recess having a seat 76 surrounding an aperture 77. The aperture closing means in the form of a ball 78 or a plug 79 having a projection 80 is inserted into the recess of each aperture to be closed and engages in the seat 76 of the recess.

It is necessary to close the apertures not covered by a workpiece during any part of a transfer operation to prevent breaking the vacuum applied to the workpiece and this can be achieved by placing the balls or plugs in the holes by means of a magnet. An alternative method of removing the balls from the apertures consists in placing a sheet of material, for example paper or plastic, having a layer of adhesive on one of its surfaces, with the adhesive surface in contact with the apertured surface of the bed parts, applying an air pressure through the apertures to the balls or plugs in the aperture recesses, thereby forcing them against the adhesive surface of the sheet covering the holes. The sheet is thereafter stripped from the bed parts carrying the balls or plugs with it. The adhesive is applied to only that portion of the sheet corresponding to the holes to be covered by the workpiece so that the balls are removed only from those apertures to be covered by the workpiece and the non-adhesive part of the sheet prevents the balls from being blown out of the remaining holes. The air pressure may be applied through the suction lines by operation of a suitable valve in the suction line to connect them to a source of air pressure, or by reversing the vacuum pump.

Yet another method of achieving the desired pattern of uncovered apertures is to place between the undersurface of the fixed bed part and the base 1b a gasket of thin flexible material such as paper. Such a gasket initially effectively blocks all the apertures of the fixed bed part as well as the cavities 1a from outside the frame and is pierced from above through the apertures to be covered by a workpiece to allow suction to be applied to the workpiece. The rest of the apertures will remain blocked by the gasket.

Turning to FIGURES 4 and 5, these show a screen printing machine having a screen apparatus 45 mounted as will be described in a printing frame 46 supporting the apparatus in a predetermined relation to a transfer apparatus 47 which is as described with reference to FIGURES 1 to 3, the fixed bed parts 1 being disposed to form a printing bed to support a workpiece for printing when the screen 48 of the apparatus 45 is in the printing position to be described. The frame 46 is pivoted at 56 to the machine frame I so as to be lifted clear of the screen for changing the screen or for maintaining the machine. The height of the screen with respect to the supporting surfaces of the fixed bed parts and the printing apparatus can be adjusted by means of the nuts 167 and 168 (one set only shown in FIG. 5). The nuts are screwed onto a screw 169 fixed in the frame of the printing apparatus and passing through the frame 170 of the screen 48. The nut 167 is loosened, the frame 170 raised or lowered by adjusting the nut 168 and the nut 167 is then re-tightened.

A power operated device in the form of a cyclinder 54 is provided to move the operable parts of the printing apparatus with respect to the screen as hereinafter explained. The inking device of the printing apparatus has a flexible blade 50 mounted in a holder 51 which is in turn mounted on a bell crank lever 52, being secured thereon by a bolt 175. The holder 51 is slotted at 176 so that its position may be adjusted on the bell crank lever 52 on loosening the bolt 175, the threaded portion 177 of which passes through the slot 176. The lever 52 is pivoted at 174 to a crosshead 183 and has an arm 178 which is pivotally connected at 179 to the piston rod 180 of a cylinder 54 fixed to the frame 46 by a block 184. Also pivotally connected at 179 to the piston rod 180 is a bell crank lever 181 on which is mounted an ink spreading blade 53. The lever 181 is pivoted at 182 to the supporting member 183. A second fluid pressure cylinder 49 is secured to the frame 46 by a block 290 and has a piston rod 188, parallel to the rod 180, connected at its outer end to the crosshead 183 which is slidably mounted on rods 391 mounted in the frame 46 parallel to the rods 180 and 188. The piston rod 188 thus follows the travel of the crosshead 183 and the resistance offered by the fluid in the cylinder 49 prevents excessively rapid reversal of the inking device and hence of the blades 50 and 53.

As the piston rod 180 moves to the right in FIG. 5, the lever 181 pivots in a clockwise direction about the pivot 182 thereby lowering the spreader blade 53 nearer to the surface 55 of the screen and at the same time the lever 52 carrying the flexible blade assembly pivots in an anti-clockwise direction, thus raising the flexible blade away from the surface of the screen. The movement of the lever 52 and hence that of the lever 181 is limited by a stop 172 which abuts the end of a screw 171 and the amount of this movement can be adjusted by means of the screw 171. As soon as the stop 172 abuts the end of the screw 171, the inking assembly traverses the surface of the screen but without touching it and ink is spread thereon by the blade 53. The travel of the inking device is checked by the stop 185 thereon abutting the end 186 of the screw 187 and can be adjusted by means of this screw 187.

At the commencement of the return stroke of cylinder 54, the blade 53 is pivoted away from the surface of the screen and the flexible blade pivots in the opposite direction onto the surface of the screen the travel of the blade being controlled by the stop 173 and the screw 170 so that the desired pressure on the screen is achieved. When the stop 173 contacts the end of the screw 170, the inking assembly moves back across the screen and the flexible blade 50 pressing on the screen distributes the ink over the screen and forces it through the mesh of the screen onto a workpiece thereunder by a squeegee action.

The frame 46 of the printing apparatus, pivoted at 56 to the frame I of the machine, is clamped thereto by a lever clamp 57, and can be swung upwardly away from the fixed bed part of the transfer apparatus on releasing the clamp 57 to facilitate ready access to the screen.

At the left hand side of the machine as shown in FIGURE 4 there is provided a conveyor driven by a motor 58 for continuous removal of printed workpieces from the delivery position C and feeding to the device E when employed. The conveyor comprises two conveyor belts 59 (seen more clearly in FIGURE 5) driven from two pulleys 60 or the like of the motor 58. The belts pass over a roller bar 61 extending substantially across the width of the machine frame and projecting beyond the left hand vertical edge 62 of the machine, and over two further pulleys 63 between which one of the movable bed parts 4 passes when in the extreme position C. The continuous conveyor is completed by the belts returning over pulleys 110 to the motor pulleys 60 and the conveyor moves in the direction shown by the arrows adjacent thereto in FIGURE 4. The tension of the conveyor belt can be adjusted by slackening the bolt 64 and adjusting the height of the motor 58 in the frame I and thereafter locking the motor in position by retightening the bolt 64.

At the right hand side of the machine (FIG. 4) a belt 73 passes over pulleys 65 and 66 or the like mounted in the machine frame 35. One end of the belt is attached to the movable bed part 5 and the other end is attached to the machine frame by the bolt 67. The lower pulley 66 or the like has its axle 68 mounted in a vertical slot 69 and the axle is attached by a flexible wire 70 or the like passing over a roller 71 to a tension spring 72 the other end of which is attached to the frame I at 35. As the movable bed part 5 travels from the loading position A to the printing position B, the pulley 66 travels up the slot 69 thereby allowing the belt 73 to be pulled along by the movable bed part 5 to move a workpiece into the loading position A. As the movable bed part 5 returns to position A, the belt 73 and the pulley 66 are returned to their original positions by the tension spring 72. The belt 73 forms a loading conveyor for the moving bed part and/or acts as a safety device by preventing the insertion of a limb or unwanted obstruction into the gap left by the moving bed part when moving towards position B. It is possible, when rigid materials are to be printed, to attach to the end of the belt 73 a plate like member which bears on the rear of the workpiece and ensures a positive feed to the printing position.

Figure 9:
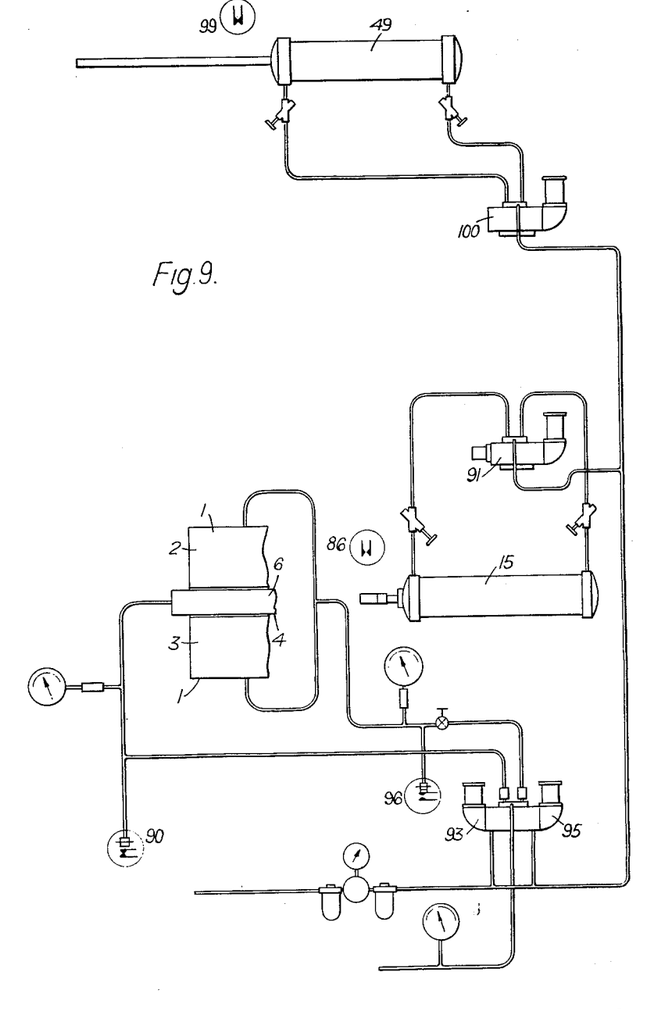
FIGURE 9 is a line diagram of the fluid pressure circuit of the said preferred control circuit.

Referring to the circuit diagrams of FIGURES 9 and 10, the operation of a screen printing machine having the control system diagrammatically shown is as follows.

When the ON-OFF switch 150 is closed, the indicator light 111 glows and the vacuum 112 starts to operate, applying vacuum to the fixed bed parts.

For single cycle operation, the switch 85 is open. The switch 86 is closed by the movable bed parts being in their rear position, i.e. with their surfaces disposed in the loading and printing positions, and a single cycle of operation is initiated by pressing the button 87. This energises coil X of the changeover relay RIXY so that contact 88 operated by this coil is closed, thereby completing a circuit through switch 89 (which is closed for single cycle operation, to isolate the vacuum switch 90) to energise solenoid 91. This applies pneumatic pressure to the right hand side of cylinder 15 and forces the movable bed parts forward the full distance of their travel conveying one workpiece from the loading position to the printing position and another workpiece from the printing position to the delivery position. Simultaneously with this operation, solenoid 93 is energised through contact 88, changing over the vacuum from the fixed bed part to the movable bed parts to hold the workpiece on the supporting surfaces of the movable bed parts during the transfer operation.

On arriving at the full extent of their travel the movable bed parts close micro-switch 94 thereby energising solenoid 95 and changing the vacuum over from the movable bed parts to the fixed bed part to hold a workpiece in place during the printing operation and to release the workpiece now in the delivery position. At the same time, the changeover relay RIXY switches from coil X to coil Y, thereby opening contact 88 and de-energising solenoid 91 and solenoid 93. Solenoid 91 changes over the pneumatic pressure to the other end of cylinder 15 and returns the movable bed parts to their initial positions. As soon as micro-switch 94 closes, relay 92 is energised through vacuum switch 96 (provided this is closed) and contacts 97 and 98 close. Contact 97 provides a "hold on" circuit for relay 92 through micro-switch 99 after micro-switch 94 opens since relay 92 would otherwise open immediately the movable bed parts moved away from their second position. When contact 98 closes (and this happens when micro-switch 94 closes, i.e. when the movable bed parts have travelled to their outermost position) solenoid 100 is energised, pressure is admitted to the right hand side of cylinder 49 by means of the valve associated with solenoid 100 and the printing stroke is thereby effected. However at the extremity of the printing stroke, micro-switch 99 is opened, relay 92 is de-energised and contacts 97 and 98 open. Solenoid 100 is de-energised, the pressure in cylinder 49 is reversed by means of the said valve associated with solenoid 100 and the printing apparatus returns to its initial position.

It will be noted that it is only necessary to press button 87 momentarily to energise coil X of relay RIXY and only one cycle will take place automatically after button 87 is released.

Automatic continuous operation can be initiated by closing the switch 85, the principle of operation being similar to that for single cycle working except that switch 89 is opened for automatic cycle working. Thus the circuit to the solenoid operating the movable bed part depends for its completion on the vacuum switch 90 which will only close when a predetermined vacuum level is attained at the working surfaces of the movable bed parts, i.e. when workpieces are in position thereon. Vacuum switch 96 provides a similar safeguard in that it only allows a printing stroke to take place when a workpiece rests in the printing position on the fixed bed part.

It has been found that if an excessive vacuum is applied to workpieces consisting of certain materials, for example very thin paper, a certain amount of residual suction is present after the supply has been disconnected thereby making it difficult to remove the workpieces from the bed parts. In order to overcome this difficulty, means are provided in the form of valves for example, to set the valve of the reduced pressure at which the vacuum switches 90 and 96 close so that when a material such as thin paper is employed, the machine can be set to operate at an appropriately lower valve of suction. The aforesaid means are housed in the control box D fixed to the main frame of the machine.

In order to facilitate rapid and accurate location of workpieces in the loading position when loading by hand, a locating plate 196 is placed in the loading position. Such a plate has a number, e.g. three, projections 191 so that when a workpiece is placed with its edges in contact with all these projections simultaneously, it is correctly aligned to be transferred to the printing position.

As an alternative to hand loading, the printing machine may incorporate a conventional magazine or stack feeding device disposed in the loading position to automatically place successive workpieces in correct alignment to the loading position for subsequent transfer to the printing position.

Figure 10:
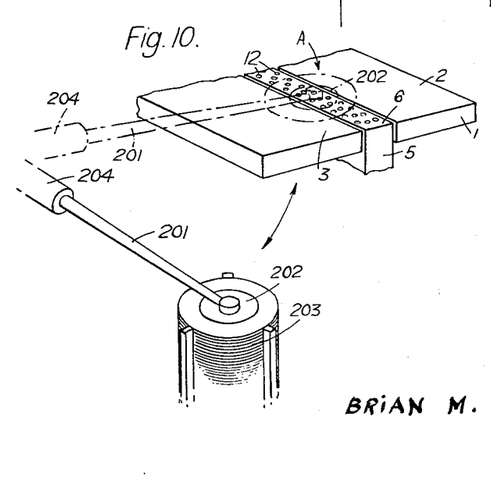
FIGURE 10 is a perspective view of a preferred loading device.

A preferred loading device as shown in FIG. 10 consists of an arm 201 having a suction head 202 supplied through a flexible tube 204 by a source of vacuum which may be the same as that supplying the bed part apertures. The arm is arranged to operate in timed relation to the movement of the movable bed parts to move successive workpieces from a stack 203 into the initial or loading position A when one of the movable bed parts is disposed in this position and to release the workpieces at the loading position to be held by the said movable bed part.

The printing machine can be adapted to take workpieces joined in a continuous belt which is moved in successive steps through the loading, printing and delivery positions. An untensioned loop of material is provided before the loading position and after the delivery position to preclude any possibility of drag occurring on the material passing through the machine. This type of feed is mainly employed when printing on metal and plastic sheets.

Although the apparatus of the invention has been described by way of example on a machine for screen printing, it can be employed in cliche printing and foil embossing machines by substituting the screen printing mechanism by the appropriate alternative mechanism, but it will be understood that the transfer mechanism can be used for transferring plate-like workpieces or ar-

I claim:

1. An apparatus for transferring workpieces through a series of successive spaced positions, said apparatus comprising a bed presenting supporting surfaces to the workpieces, said bed having at least one fixed part and at least two movable parts, a number of apertures in the supporting surfaces of the bed parts connected through ducts to a source of suction, means for closing all the apertures not covered by a workpiece disposed on the bed while leaving open those covered by the workpieces during any stage of the transfer operation, means for moving each of the movable bed parts between successive positions, and control means operable to apply the suction to the apertures in a predetermined sequence to permit the workpieces to be held in contact with a supporting surface of at least one of the bed parts during movement of the movable bed part.

2. An apparatus according to claim 1 wherein three equally spaced working positions are provided through which workpieces are to be moved in successive steps, the fixed bed part being in the intermediate position, and the movable bed part has in its direction of movement aligned two spaced supporting surfaces mounted on a carriage movable with respect to the fixed bed part, the distance between said surfaces being equal to the distance between two consecutive working positions whereby workpieces supported at the first and second positions are transferred by the moving bed part to the second and third positions respectively.

3. An apparatus according to claim 1 wherein the aperture closing means comprises plugs such as balls disposed in recesses in the bed parts communicating with the apertures and a source of suction operated by said control means in timed relation to said means for moving said moving bed part, the recesses having seats on which the plugs are held in a gas-tight manner when the suction is applied thereto, to close the apertures.

4. An apparatus according to claim 2 wherein the carriage for the movable bed parts is operatively connected to the moving part of a fluid operated device.

5. An apparatus according to claim 1 wherein the apertures in each moving bed part communicate with a cavity therein having an inlet connected to a flexible pipe in turn connected to a source of suction, the pipe being longer than the full length of movement of the moving bed part and looped over a rotatable member movable in the machine frame under the influence of a load to vary the length of the loop portion of the pipe to accommodate slack therein.

References Cited by the Examiner
UNITED STATES PATENTS

| | | | |
|---|---|---|---|
| 787,271 | 4/05 | Burdick | 101—114 |
| 2,327,668 | 8/43 | Rempel | 101—114 |
| 2,923,235 | 2/60 | Voegelin | 101—407 |
| 2,963,964 | 12/60 | Klump | 101—123 |

EUGENE R. CAPOZIO, *Primary Examiner.*